Aug. 28, 1951         B. ROSENFELDER         2,565,992
CHICKEN NEST
Filed July 22, 1949
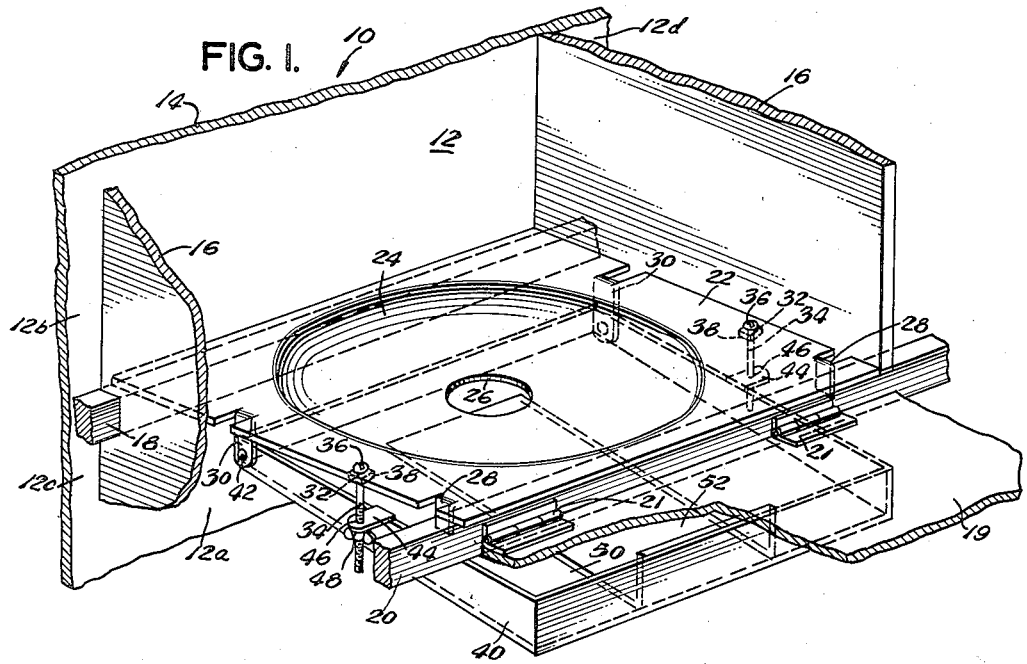
INVENTOR.
BRUNO ROSENFELDER
BY
ATTORNEY Patented Aug. 28, 1951

2,565,992

UNITED STATES PATENT OFFICE 2,565,992

CHICKEN NEST

Bruno Rosenfelder, Vineland, N. J.

Application July 22, 1949, Serial No. 106,200

16 Claims. (Cl. 119—48)

This invention relates to poultry equipments, and more particularly to a chicken nest.

An object of the invention is to provide a chicken nest which prevents chickens from sitting on the eggs or picking and eating the eggs after the laying thereof.

Another object of the present invention is to provide a chicken nest which practically eliminates the loss of eggs by breakage.

A further object of the present invention is to provide a chicken nest, which does not require the use of litter.

Still another object of the present invention is to provide a chicken nest, which greatly facilitates the collecting of eggs and permits the collecting of eggs only once a day.

A further object of the present invention is to provide a bottom for a chicken nest which may be readily substituted for the bottom of customary chicken nests so as to improve same to such an extent that they have all the advantages mentioned in the foregoing paragraphs.

Other objects and structural details of the invention will be apparent from the following description when read in conjunction with the accompanying drawings forming part of this specification, wherein:

Fig. 1 is a perspective view of a chicken nest according to the invention, some parts being broken away, and Fig. 2 is a vertical sectional view of a series of chicken nests, the bottom of the upper chicken nest being a transverse median section, and the bottom of the lower chicken nest being shown in side elevation.

Referring now to the drawings, 10 generally indicates an assembly of chicken nests comprising a series of individual chicken nests 12, 12a, 12b, 12c, 12d, 12e. The assembly 10 of chicken nests comprises a rear wall 14 and a series of vertical partitions 16 including two end walls on each side of the assembly (not shown). Furthermore, the assembly 10 of chicken nests comprises a series of horizontal supporting means or bars 18 and a series of horizontal front supporting means or bars 20. Said rear wall 12, partitions 16, end walls, and supporting bars 18 and 20 are rigidly connected with each other in any suitable manner and may be of standard construction.

The individual chicken nests 12, 12a, 12b . . . are open at the front. Each horizontal row of chicken nests, for example the row of chicken nests 12b, 12, 12d, may be closed by a flap 19 movably mounted on the front supporting bar 20 by means of hinges 21.

Each individual chicken nest has a bottom plate 22 provided with a bowl-like center portion 24. Said bowl-like portion 24 has an aperture 26 in its center. According to the embodiment shown in the drawings, each bottom plate 22 rests loosely on the supporting bars 18 and 20. The bottom plate 22 is held in its position by the abutment of its rear edge against the rear wall 12, its side edges against the partitions 16 and by the abutment of downwardly extending lugs 28 against the front supporting bar 20.

Each bottom plate 22 has a downwardly projecting portion or connecting element 30 at each side. Furthermore, each bottom plate 22 is provided with a bore 32 at each side at a distance from said connecting element 30. A connecting screw 34 having a head 36 resting on the upper surface of the bottom plate 22 is inserted in each bore 32. The screw 34 is prevented from rotation by means of a lock-nut 38 screwed on the threaded portion of the screw 34.

The rear end portion of a tray 40 arranged underneath the bowl-like portion 24 of the bottom plate 22 is swingably mounted on the connecting elements 30 at 42. Said tray 40 has a lug 44 on each side provided with a bore 46 somewhat larger than the diameter of the threaded portion of the screw 34, so that there is some play between said lug 44 and said screw 34. The tray 40 may be adjusted in a predetermined inclined position relative to the horizontal plane of the bottom plate 22 by means of thumb screws 48 screwed on the threaded portion of the screws 34 and engaged with the lower surface of the lugs 44. The tray 40 is adjusted in such a position that its surface 50 is inclined downwardly towards the front of the chicken nest and that the tray 40 passes below the front supporting bar 20 holding the associated bottom plate 22. The tray 40 extends beyond the front edge of the bottom plate 22, so that it projects from the front of the chicken nest assembly.

Preferably, a lining 52 of cushioning material, for example rubber, is attached to the surface 50 of the tray 40.

When the assembly of chicken nests is in use and the flaps 19 are in open position, an egg laid by a chicken standing on the bowl-like portion 24 of the bottom plate 22 passes through the aperture 26 on the cushioning lining 52 of the tray 40. Owing to the inclination of the surface 50 of the tray 40 the egg will roll forwardly into the collecting portion 54 of the tray 40 projecting forwardly from the chicken nest assembly and being covered by the open flap 19. Therefore, the chicken is prevented from sitting on the egg after having laid same and from picking the egg protected by the open flap 19. As a chicken cannot sit on the egg, breakage of the eggs by chickens sitting thereon is eliminated. Moreover, if a second chicken uses the same nest, it cannot cause a breakage of the egg laid by the first chicken as said egg does not remain in the bowl-like portion 24 having the aperture 26. Moreover, the chicken cannot soil the eggs. Owing to above described automatic removal of the eggs from the bowl-like portion 24 of the bottom plate 22, it is unnecessary to cover the bottom plate with litter.

It will be readily understood that a chicken nest equipped with a bottom arrangement according to the invention facilitates greatly the work of the farmer. The eggs remain clean. Moreover, the eggs do not have to be collected from underneath a chicken, which might pick the farmer. Furthermore, as the eggs roll automatically into the collecting portion 54 of the tray 40, the farmer may collect the eggs only once a day, if so desired.

It may also be noted that a chicken nest according to the invention makes the production of eggs more profitable, as the quality of the eggs is improved by preventing the chicken from sitting thereon, as the breakage of eggs is practically eliminated, as it becomes unnecessary to clean the eggs and as it becomes unnecessary to use litter in the chicken nests.

It will be understood that the inclination of the tray 40 may be readily adjusted by means of the thumb screw 48 according to needs. If desired, the effective length of the rear connecting means 30 may also be made adjustable.

The bottom assembly comprising the bottom plate 22 and tray 40 connected with each other in the manner described above may be readily substituted for the flat bottom plates customarily used in hitherto known chicken nest assemblies. The adjustability of the tray 40 relative to the bottom plate 22 permits the adjustment of said tray in such a position that it passes below the front supporting bar 20 of a customary chicken nest assembly.

I have described a preferred embodiment of my invention, but it is understood that this disclosure is for the purpose of illustration and that various omissions or changes in shape, proportion and arrangement of parts, as well as the substitution of equivalent elements for those herein shown and described, may be made without departing from the spirit and scope of the invention, as set forth in the appended claims.

For example, the connection between the tray 40 and the bottom plate 22 may be made of a different construction. Furthermore, in the construction of new chicken nest assemblies, the inclined tray 40 may be connected to other parts of the chicken nest than the bottom plate thereof.

What I claim is:

1. In a chicken nest, the combination of: a substantially horizontal bottom plate including a bowl-like portion, said bowl-like portion being provided with an aperture substantially in its center, and a collecting tray underneath said bowl-like portion, said tray being suspended from said bottom plate and being inclined downwardly towards the front of the chicken nest.

2. In a chicken nest, the combination of: a substantially horizontal bottom plate including a bowl-like portion, said bowl-like portion being provided with an aperture substantially in its center, and a collecting tray underneath said bowl-like portion, said tray being suspended from said bottom plate and being inclined downwardly towards the front of the chicken nest, and said tray extending beyond the front end of said bottom plate and projecting from the front of said chicken nest.

3. In a chicken nest as claimed in claim 2, said connecting tray being adjustable suspended from said bottom plate and setting means associated with said collecting tray for adjusting its inclination relative to said bottom plate.

4. In a chicken nest, the combination of: a substantially horizontal bottom plate including a bowl-like portion, said bowl-like portion being provided with an aperture substantially in its center, a collecting tray underneath said bowl-like portion, said tray being suspended from said bottom plate and being inclined downwardly towards the front of the chicken nest, said tray extending beyond the front end of said bottom plate and projecting from the front of said chicken nest, and means associated with the projecting portion of the tray for covering same.

5. In a chicken nest, the combination of: an entrance doorway in the front portion of the chicken nest, a flap hinged to the front portion of said chicken nest for closing and opening said passage, a substantially horiozntal bottom plate including a bowl-like portion, said bowl-like portion being provided with an aperture substantially in its center, and a collecting tray underneath said bowl-like portion, said tray being suspended from said bottom plate and being inclined downwardly towards the front of the chicken nest, said tray extending beyond the front end of said bottom plate and projecting from the front of said chicken nest below said flap, and said flap covering the projecting portion of the tray when said flap is swung about the axis of its hinge connection into a substantially horizontal position for opening said entrance doorway.

6. In a chicken nest, the combination of: an entrance doorway in the front portion of the chicken nest, supporting means including front supporting means, a flap hinged to said front supporting means for closing and opening said entrance doorway of the chicken nest, a substantially horizontal bottom plate carried by said supporting means, said bottom plate including a bowl-like portion having an aperture substantially in its center, a collecting tray adjustably suspended from said bottom plate and arranged underneath said bowl-like portion, and setting means associated with said tray for setting same relative to said bottom plate in a predetermined position inclined downwardly towards the front of the chicken nest, said tray extending beyond the front end of said bottom plate and below said front supporting means and projecting from the front of said chicken nest, and said flap covering the projecting portion of the tray when said flap is swung about the axis of its hinge connection into a substantially horizontal position for opening said entrance doorway.

7. In a chicken nest, the combination of: an entrance doorway in the front portion of the chicken nest, supporting means including front supporting means, a flap hinged to said front supporting means for closing and opening said entrance doorway of the chicken nest, a substantially horizontal bottom plate detachably mounted on said supporting means, said bottom plate including a bowl-like portion having an aperture substantially in its center, a collecting tray adjustably suspended from said bottom plate and arranged underneath said bowl-like portion, and setting means associated with said tray for setting same relative to said bottom plate in a predetermined position inclined downwardly towards the front of the chicken nest, said tray extending beyond the front end of said bottom plate and below said front supporting means and projecting from the front of said chicken nest, and said flap covering the projecting portion of the tray when said flap is swung about the axis of its hinge connection into a substantially horizontal position for opening said entrance doorway.

8. In a chicken nest, the combination of: an entrance doorway in the front portion of the chicken nest, supporting means including front supporting means, a flap hinged to said front supporting means for closing and opening said entrance doorway of the chicken nest, a substantially horizontal bottom plate carried by said supporting means, said bottom plate including a bowl-like portion having an aperture substantially in its center, a collecting tray adjustably connected to said bottom plate and arranged underneath said bowl-like portion, a lining of cushioning material arranged on said tray, and setting means associated with said tray for setting same relative to said bottom plate in a predetermined position inclined downwardly towards the front of the chicken nest, said tray extending beyond the front end of said bottom plate and below said front supporting means and projecting from the front of said chicken nest, and said flap covering the projecting portion of the tray when said flap is swung about the axis of its hinge connection into a substantially horizontal position for opening said entrance doorway.

9. A bottom for a chicken nest comprising: a plate including a bowl-like portion, said bowl-like portion being provided with an aperture substantially in its center, and a tray suspended from said plate, said tray being arranged below said bowl-like portion in a plane inclined relative to the plane of said plate.

10. A bottom for a chicken nest comprising: a plate including a bowl-like portion, said bowl-like portion being provided with an aperture substantially in its center, and a tray suspended from said plate, said tray being arranged below said bowl-like portion in a plane inclined relative to the plane of said plate, and said tray extending beyond said plate in the direction of its inclination.

11. A bottom for a chicken nest comprising: a plate including a bowl-like portion, said bowl-like portion being provided with an aperture substantially in its center, a tray suspended from said plate, said tray being arranged below said bowl-like portion in a plane inclined relative to the plane of said plate, and a lining of cushioning material arranged on said tray.

12. A bottom for a chicken nest comprising: a plate including a bowl-like portion, said bowl-like portion being provided with an aperture substantially in its center, a collecting tray adjustably suspended from said plate and arranged below said bowl-like portion, and setting means associated with said tray for setting same in a predetermined plane at an angle to the plane of said plate.

13. A bottom for a chicken nest comprising: a plate including a bowl-like portion, said bowl-like portion being provided with an aperture substantially in its center, pairs of connecting means connected to said plate at opposite sides thereof, said connecting means projecting downwardly from said plate, a collecting tray connected to the projecting end portions of said connecting means and arranged below said bowl-like portion, the effective length of at least one connecting means of each pair of connecting means being adjustable, and adjusting means associated with the connecting means of adjustable effective length for setting the tray in a predetermined plane at an angle to the plane of said plate.

14. A bottom for a chicken nest comprising: a plate including a bowl-like portion, said bowl-like portion being provided with an aperture substantially in its center, two pairs of connecting means, each including a front and rear connecting means connected to said plate at opposite sides thereof, said connecting means projecting downwardly from said plate, a collecting tray connected to the projecting end portions of said connecting means and arranged below said bowl-like portion, the effective length of at least one connecting means included in each pair of connecting means being adjustable, and adjusting means associated with the adjustable connecting means of each pair for setting the tray in a predetermined plane at an angle to the plane of said plate, and said tray extending beyond said plate in the direction of its inclination.

15. A bottom for a chicken nest comprising: a plate including a bowl-like portion, said bowl-like portion being provided with an aperture substantially in its center, two pairs of connecting means, each including a front and rear connecting means connected to said plate at opposite sides thereof, said connecting means projecting downwardly from said plate, a collecting tray connected to the projecting end portions of said connecting means and arranged below said bowl-like portion, the effective length of at least one connecting means included in each pair of connecting means being adjustable, adjusting means associated with the adjustable connecting means of each pair for setting the tray in a predetermined plane at an angle to the plane of said plate, and a lining of cushioning material arranged on said tray.

16. A bottom for a chicken nest comprising: a plate including a bowl-like portion, said bowl-like portion being provided with an aperture substantially in its center, two pairs of connecting means, each including a front and rear connecting means connected to said plate at opposite sides thereof, said connecting means projecting downwardly from said plate, a collecting tray connected to the projecting end portions of said connecting means and arranged below said bowl-like portion, the effective length of at least one connecting means included in each pair of connecting means being adjustable, adjusting means associated with the adjustable connecting means of each pair for setting the tray in a predetermined plane at an angle to the plane of said plate, and a lining of cushioning material arranged on said tray, said tray extending beyond said plate in the direction of its inclination.

BRUNO ROSENFELDER.

REFERENCES CITED

The following references are of record in the file of this patent:

UNITED STATES PATENTS

| Number | Name | Date |
|---|---|---|
| 1,402,790 | Olson | Jan. 10, 1922 |
| 1,721,650 | Tweet | July 23, 1929 |
| 1,914,160 | Pine | June 13, 1933 |
| 2,049,121 | Johnson | July 28, 1936 |
| 2,253,451 | Ulerick | Aug. 19, 1941 |
| 2,279,147 | Stimson | Apr. 7, 1942 |